(12) United States Patent
Kovach (10) Patent No.: US 11,617,294 B2
(45) Date of Patent: Apr. 4, 2023

(54) ORIENTATION CONTROL SYSTEM FOR AN AGRICULTURAL IMPLEMENT

(71) Applicant: CNH Industrial America LLC, New Holland, PA (US)

(72) Inventor: Michael George Kovach, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 567 days.

(21) Appl. No.: 16/830,531

(22) Filed: Mar. 26, 2020

(65) Prior Publication Data

US 2021/0298218 A1  Sep. 30, 2021

(51) Int. Cl.
*A01B 49/02* (2006.01)
*A01B 63/00* (2006.01)
(Continued)

(52) U.S. Cl.
CPC .......... *A01B 63/008* (2013.01); *A01B 49/027* (2013.01); *A01B 63/22* (2013.01);
(Continued)

(58) Field of Classification Search
CPC ..... A01B 49/02; A01B 49/022; A01B 49/025; A01B 63/008; A01B 49/027; A01B 63/22;
(Continued)

(56) References Cited

U.S. PATENT DOCUMENTS 3,642,087 A  2/1972 Sampey
4,413,685 A  11/1983 Gremelspacher et al.
(Continued)

FOREIGN PATENT DOCUMENTS

CA  2633434 A1 * 5/2009 .......... A01B 29/048
CN  105783839  7/2016
(Continued)

OTHER PUBLICATIONS

Path-tracking simulation and field tests for an auto-guidance tillage tractor for a paddy field Author links open overlay panelXiong ZheHan et al.; Computers and Electronics in Agriculture vol. 112, Mar. 2015, pp. 161-171; (Year: 2015).*

(Continued)

*Primary Examiner* — Cuong H Nguyen
(74) *Attorney, Agent, or Firm* — Rebecca Henkel; Rickard DeMille (57) ABSTRACT

An orientation control system for an agricultural implement includes a first sensor configured to be positioned at a left end portion of a frame. The first sensor is configured to emit a first output signal toward a soil surface and to receive a first return signal indicative of a first height of the left end portion. The orientation control system also includes a second sensor configured to be positioned at a right end portion of the frame. The second sensor is configured to emit a second output signal toward the soil surface and to receive a second return signal indicative of a second height of the right end portion. In addition, the orientation control system includes a controller configured to control first, second, and third actuators such that a difference between the first height and the second height is less than a threshold value.

20 Claims, 3 Drawing Sheets

(51) Int. Cl.
*A01B 63/22* (2006.01)
*A01B 79/00* (2006.01)
*G01S 13/86* (2006.01)
*G01S 17/08* (2006.01)
*G01S 15/08* (2006.01)
*G01B 7/02* (2006.01)
*G01S 13/08* (2006.01)

(52) U.S. Cl.
CPC ............ *A01B 79/005* (2013.01); *G01B 7/023* (2013.01); *G01S 13/08* (2013.01); *G01S 13/862* (2013.01); *G01S 13/865* (2013.01); *G01S 15/08* (2013.01); *G01S 17/08* (2013.01)

(58) Field of Classification Search
CPC ... A01B 79/005; A01B 63/1112; G01S 17/08; G01S 15/08; G01S 13/865; G01S 13/862; G01S 13/08; G01B 7/023
USPC ..................................... 172/2, 4; 701/50–51
See application file for complete search history.

(56) References Cited

U.S. PATENT DOCUMENTS

| | | | |
|---|---|---|---|
| 4,491,183 A | 1/1985 | Anderson et al. | |
| 4,679,633 A | 7/1987 | Kauss | |
| 4,775,940 A | 10/1988 | Nishida et al. | |
| 4,776,153 A | 10/1988 | DePauw et al. | |
| 5,060,205 A | 10/1991 | Phelan | |
| 5,430,651 A | 7/1995 | Nielsen et al. | |
| 5,488,817 A | 2/1996 | Paquet et al. | |
| 5,535,577 A | 7/1996 | Chmielewski et al. | |
| 5,621,666 A | 4/1997 | O'Neall et al. | |
| 5,711,139 A | 1/1998 | Swanson | |
| 5,794,421 A | 8/1998 | Maichle | |
| 6,012,534 A * | 1/2000 | Kovach ............... | A01B 13/08 172/156 |
| 6,076,611 A | 6/2000 | Rozendaal et al. | |
| 6,089,327 A | 7/2000 | Kimura et al. | |
| 6,131,919 A | 10/2000 | Lee et al. | |
| 6,164,385 A | 12/2000 | Buchi | |
| 6,216,794 B1 | 4/2001 | Buchi | |
| 6,222,628 B1 | 4/2001 | Gorallo et al. | |
| 6,305,478 B1 | 10/2001 | Friggstad | |
| 6,588,187 B2 | 7/2003 | Englestad et al. | |
| 6,698,524 B2 | 3/2004 | Bernhardt et al. | |
| 6,813,873 B2 | 11/2004 | Allwörden et al. | |
| 6,990,390 B2 | 1/2006 | Groth et al. | |
| 7,028,554 B2 | 4/2006 | Adamchuk et al. | |
| 7,063,167 B1 | 6/2006 | Staszak et al. | |
| 7,540,129 B2 | 6/2009 | Kormann | |
| 7,540,130 B2 | 6/2009 | Coers et al. | |
| 7,748,264 B2 | 7/2010 | Prem | |
| 7,866,671 B2 | 1/2011 | Madler | |
| 7,870,709 B2 | 1/2011 | Digman | |
| 8,573,319 B1 | 11/2013 | Casper et al. | |
| 8,720,170 B2 | 5/2014 | Deneault et al. | |
| 8,751,147 B2 | 6/2014 | Colwell | |
| 8,752,642 B2 | 6/2014 | Whalen et al. | |
| 8,827,001 B2 | 9/2014 | Wendte et al. | |
| 8,843,283 B2 | 9/2014 | Strelioff et al. | |
| 8,857,530 B2 | 10/2014 | Henry | |
| RE45,303 E | 12/2014 | Henry et al. | |
| 8,977,441 B2 | 3/2015 | Grimes et al. | |
| 9,026,321 B2 | 5/2015 | Henry et al. | |
| 9,301,439 B2 | 4/2016 | Gilstring | |
| 9,351,443 B2 | 5/2016 | Miller et al. | |
| 9,405,039 B2 | 8/2016 | Anderson | |
| 9,481,294 B2 | 11/2016 | Sauder et al. | |
| 9,510,498 B2 | 12/2016 | Tuttle et al. | |
| 9,516,802 B2 | 12/2016 | Zemenchik | |
| 9,554,098 B2 | 1/2017 | Casper et al. | |
| 9,554,504 B2 | 1/2017 | Houck | |
| 9,585,298 B2 | 3/2017 | Henry et al. | |
| 9,585,307 B2 | 3/2017 | Holland | |
| 9,693,496 B2 | 7/2017 | Tevs et al. | |
| 9,706,696 B2 | 7/2017 | Gschwendtner | |
| 9,750,174 B2 | 9/2017 | Sauder et al. | |
| 9,801,329 B2 | 10/2017 | Zielke | |
| 9,861,022 B2 | 1/2018 | Bassett | |
| 9,980,422 B2 | 5/2018 | Czapka et al. | |
| 10,045,474 B2 | 8/2018 | Bachman et al. | |
| 10,104,822 B2 | 10/2018 | Couchman | |
| 10,123,475 B2 | 11/2018 | Posselius et al. | |
| 10,178,823 B2 | 1/2019 | Kovach et al. | |
| 10,219,421 B2 | 3/2019 | Achen et al. | |
| 10,440,876 B2 * | 10/2019 | Sporrer ................. | A01B 63/14 |
| 10,667,454 B2 * | 6/2020 | Sporrer ................. | A01B 63/32 |
| 10,750,653 B2 * | 8/2020 | Sporrer ................. | A01B 5/04 |
| 10,820,476 B2 | 11/2020 | Stoller et al. | |
| 11,470,757 B2 * | 10/2022 | Hertzog ................ | A01B 63/32 |
| 11,483,959 B2 * | 11/2022 | Forbes ................. | A01B 23/06 |
| 2010/0017075 A1 | 1/2010 | Beajuot | |
| 2012/0227992 A1 | 9/2012 | Henry | |
| 2013/0068489 A1 | 3/2013 | Blunier et al. | |
| 2016/0029547 A1 | 2/2016 | Casper et al. | |
| 2017/0064900 A1 | 3/2017 | Zemenchik | |
| 2017/0105331 A1 | 4/2017 | Herlitzius et al. | |
| 2017/0251587 A1 | 9/2017 | Sporrer et al. | |
| 2018/0114305 A1 | 4/2018 | Strnad et al. | |
| 2018/0153088 A1 * | 6/2018 | Sporrer ............... | A01B 63/008 |
| 2018/0220577 A1 | 8/2018 | Posselius et al. | |
| 2018/0279543 A1 | 10/2018 | Kovach | |
| 2018/0299422 A1 | 10/2018 | Pregesbauer | |
| 2018/0303022 A1 | 10/2018 | Barrick et al. | |
| 2018/0310465 A1 | 11/2018 | Peterson et al. | |
| 2018/0310466 A1 | 11/2018 | Kovach et al. | |
| 2018/0340845 A1 | 11/2018 | Rhodes et al. | |
| 2019/0008088 A1 | 1/2019 | Posselius et al. | |
| 2019/0059198 A1 | 2/2019 | Schnaider et al. | |
| 2019/0235529 A1 | 8/2019 | Barrick et al. | |
| 2019/0246548 A1 | 8/2019 | Kovach et al. | |
| 2020/0000005 A1 | 1/2020 | Stanhope et al. | |
| 2020/0060062 A1 * | 2/2020 | Sporrer ................. | A01B 15/14 |
| 2020/0084954 A1 | 3/2020 | Sporrer et al. | |
| 2020/0093052 A1 | 3/2020 | Preimess et al. | |
| 2020/0100419 A1 | 4/2020 | Stanhope | |
| 2020/0337206 A1 | 10/2020 | Hertzog et al. | |
| 2021/0045280 A1 | 2/2021 | Ehlert et al. | |
| 2021/0092892 A1 | 4/2021 | Pregesbauer | |
| 2021/0092894 A1 * | 4/2021 | Forbes ................ | A01B 63/008 |
| 2021/0298215 A1 * | 9/2021 | Kovach ................ | A01B 63/008 |
| 2021/0298216 A1 * | 9/2021 | Kovach ................ | A01B 63/008 |
| 2021/0298217 A1 * | 9/2021 | Kovach ................ | A01B 63/008 |
| 2021/0298218 A1 * | 9/2021 | Kovach ................ | A01B 63/008 |
| 2021/0298221 A1 * | 9/2021 | Kovach ................. | A01B 63/22 |
| 2021/0298222 A1 * | 9/2021 | Kovach ............... | A01B 63/1112 |

FOREIGN PATENT DOCUMENTS

| | | | |
|---|---|---|---|
| CN | 109588075 | 4/2019 | |
| EP | 1273216 | 1/2003 | |
| EP | 3305052 | 4/2018 | |
| EP | 3884745 A1 * | 9/2021 | ............ A01B 49/02 |
| EP | 3884746 A1 * | 9/2021 | ........... A01B 49/027 |
| EP | 3884747 A2 * | 9/2021 | ........... A01B 49/027 |
| EP | 3884748 A1 * | 9/2021 | ........... A01B 49/027 |
| EP | 3884747 A3 * | 1/2022 | ........... A01B 49/027 |
| JP | H02167004 | 6/1990 | |
| JP | 2969808 | 11/1999 | |
| JP | H11321634 | 11/1999 | |
| JP | 2002165510 | 6/2002 | |
| JP | 2005095045 | 4/2005 | |
| WO | 2017158006 | 9/2017 | |
| WO | WO2017197274 | 11/2017 | |
| WO | 2019158454 | 8/2019 | |
| WO | WO-2021067214 A1 * | 4/2021 | ............ A01B 19/10 |

OTHER PUBLICATIONS

J. De Baerdemaeker, A. Munack, H. Ramon and H. Speckmann, "Mechatronic systems, communication, and control in precision (56) References Cited

OTHER PUBLICATIONS agriculture," in IEEE Control Systems Magazine, vol. 21, No. 5, pp. 48-70, Oct. 2001, doi: 10.1109/37.954519.(Year: 2001).*
Autonomous navigation using a robot platform in a sugar beet field; TijmenBakker et al; Biosystems Engineering vol. 109, Issue 4, Aug. 2011, pp. 357-368; (Year: 2011).*
A review of autonomous agricultural vehicles (The experience of Hokkaido University); Ali Roshanianfard et al.; Journal of Terramechanics vol. 91, Oct. 2020, pp. 155-183 ; (Year: 2010).*
EP Application No. 19171136.5 Extended European Search Report dated Nov. 6, 2019, 22 pgs.
Gilliot et al., "Soil Surface Roughness Measurement: A New Fully Automatic Photogrammetric Approach Applied To Agricultural Bare Fields," Computers and Electronics in Agriculture, Jan. 23, 2017, pp. 63-78, Elsevier, https://www.researchgate.net/publication/312651105_Soil_surface_roughness_measurement_A_new_fully_automatic_photogrammetric_approach_applied_to_agricultural_bare_fields.
Hart-Carter Co., "Automatic Header Adjustment," Farm Show Magazine. 1984, p. 33, vol. #8, Issue #6.
Raper et al., "A Portable Tillage Profiler for Measuring Subsoiling Disruption," American Society of Agricultural Engineers, 2004, pp. 23-27, vol. 47(1), https://www.ars.usda.gov/ARSUserFiles/60100500/csr/ResearchPubs/raper/raper_04a.pdf.
Yasin et al., "Non-Contact System for Measuring Tillage Depth," Computers and Electronics in Agriculture, 1992, pp. 133-147, https://www.researchgate.net/publication/229318888_Non-contact_system_for_measuring_tillage_depth.
Peteinatos et al., "Precision Harrowing With a Flexible Tine Harrow and an Ultrasonic Sensor," Jul. 2015, Precision Agricultural, pp. 579-586, https://www.researchgate.net/publication/281437517_Precision_harrowing_with_a_lexible_tine_harrow_and_an_ultrasonic_sensor.
"Tiger-Mate® 255 Field Cultivator," 2017, Case IH Agriculture, 24 pgs.
"Ecolo-Tiger® 875 Disk Ripper," 2018, Case IH Agriculture, 16 pgs.
U.S. Appl. No. 16/830,331, filed Mar. 26, 2020, Michael George Kovach.
U.S. Appl. No. 16/830,335, filed Mar. 26, 2020, Michael George Kovach.
U.S. Appl. No. 16/830,344, filed Mar. 26, 2020, Michael George Kovach.
U.S. Appl. No. 16/830,373, filed Mar. 26, 2020, Michael George Kovach.
U.S. Appl. No. 16/830,410, filed Mar. 26, 2020, Michael George Kovach.
EP Application No. 21165022.1, Search Report dated Aug. 6, 2021, 8 pgs.
EP Application No. 21165029.6, Search Report dated Aug. 6, 2021, 7 pgs.
EP Application No. 21165028.8, Search Report dated Aug. 9, 2021, 14 pgs.
EP Application No. 21165025.4, Search Report dated Aug. 6, 2021, 9 pgs.
EP Application No. 21165028.8 Extended Search Report, dated Dec. 10, 2021, 13 pgs.

* cited by examiner

ORIENTATION CONTROL SYSTEM FOR AN AGRICULTURAL IMPLEMENT

BACKGROUND

The present disclosure relates generally to an orientation control system for an agricultural implement.

Certain agricultural implements include ground engaging tools configured to interact with the soil. For example, a tillage implement may include tillage points and/or disc blades configured to break up the soil for subsequent planting or seeding operations. Certain tillage implements extend a significant distance perpendicular to the direction of travel of the tillage implement. During operation, the tillage implement may become tilted in a lateral (e.g., side-to-side) direction due to variations in the soil surface. Due to the significant width of the tillage implement, the lateral tilting may cause the penetration depth of ground engaging tools positioned at the left and right end portions of the tillage implement to be significantly different than a target penetration depth. As a result, the effectiveness of the tillage operation may be substantially reduced while the tillage implement is tilted in the lateral direction.

BRIEF DESCRIPTION

In certain embodiments, an orientation control system for an agricultural implement includes a first sensor configured to be positioned at a left end portion of a frame of the agricultural implement and directed toward a soil surface. The first sensor is configured to emit a first output signal toward the soil surface and to receive a first return signal indicative of a first height of the left end portion of the frame above the soil surface. The orientation control system also includes a second sensor configured to be positioned at a right end portion of the frame of the agricultural implement and directed toward the soil surface. The second sensor is configured to emit a second output signal toward the soil surface and to receive a second return signal indicative of a second height of the right end portion of the frame above the soil surface. In addition, the first and second sensors are configured to be positioned at one of a forward end portion of the frame or a rearward end portion of the frame. The orientation control system also includes a third sensor configured to be positioned at the other of the forward end portion of the frame or the rearward end portion of the frame. The third sensor is configured to be directed toward the soil surface, and the third sensor is configured to emit a third output signal toward the soil surface and to receive a third return signal indicative of a third height of the other of the forward end portion of the frame or the rearward end portion of the frame. The orientation control system includes a first actuator configured to be coupled to a hitch assembly of the agricultural implement. The first actuator is configured to control a position of a hitch of the hitch assembly relative to the frame along a vertical axis. The orientation control system also includes a second actuator configured to be coupled to a first wheel assembly of the agricultural implement. The second actuator is configured to control a position of the first wheel assembly relative to the frame along the vertical axis. Furthermore, the orientation control system includes a third actuator configured to be coupled to a second wheel assembly of the agricultural implement. The third actuator is configured to control a position of the second wheel assembly relative to the frame along the vertical axis. The orientation control system also includes a controller comprising a memory and a processor. The controller is communicatively coupled to the first sensor, to the second sensor, to the third sensor, to the first actuator, to the second actuator, and to the third actuator, and the controller is configured to control the first, second, and third actuators such that a difference between the first height and the second height is less than a threshold value, and a difference between the first height and the third height is less than the threshold value.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
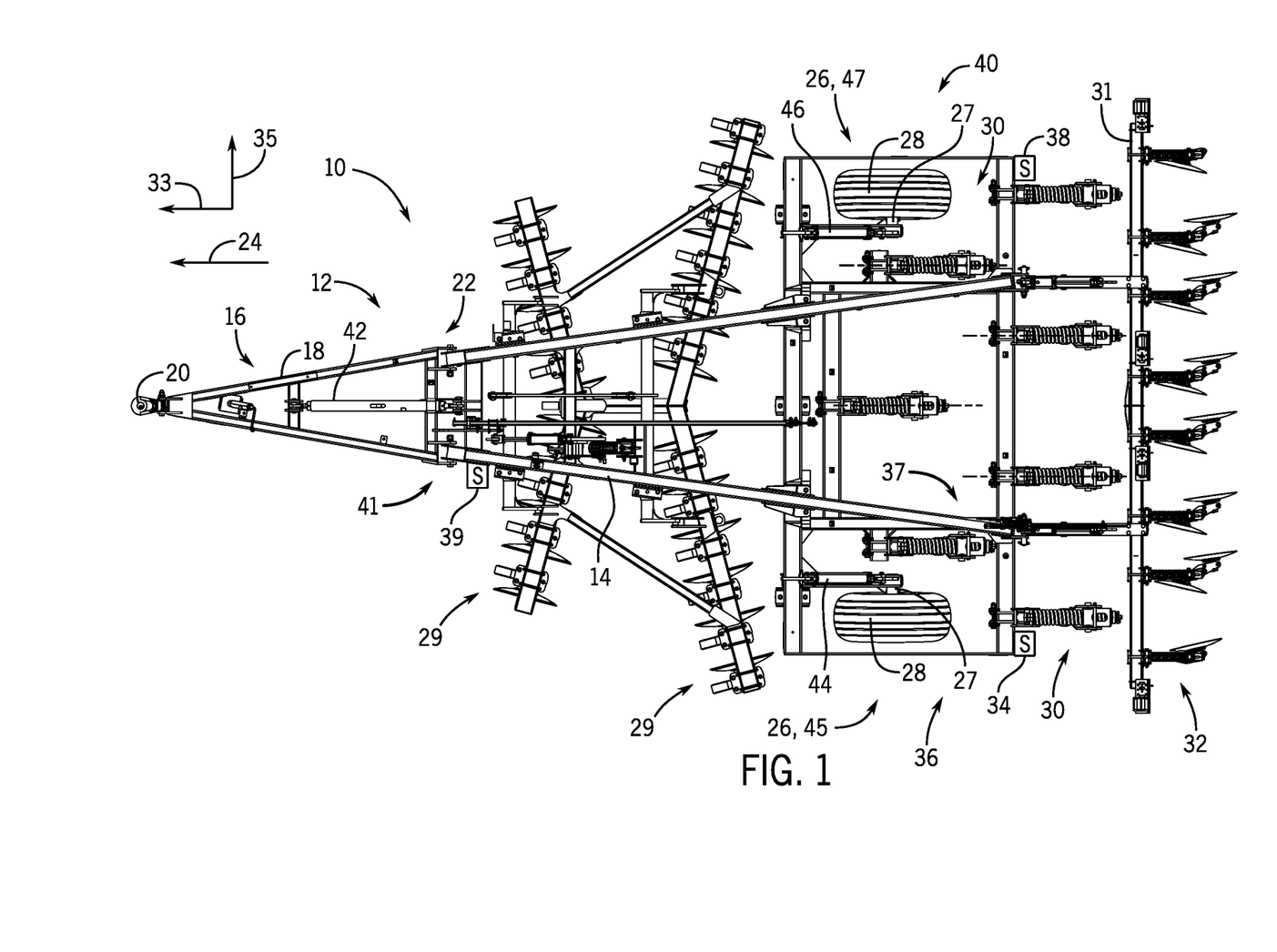
FIG. 1 is a top view of an embodiment of an agricultural implement having an orientation control system.

FIG. 1 is a top view of an embodiment of an agricultural implement 10 having an orientation control system 12. In the illustrated embodiment, the agricultural implement 10 is a primary tillage implement having multiple ground engaging tools configured to till soil. As illustrated, the agricultural implement 10 includes a frame 14 and a hitch assembly 16 coupled to the frame 14. The frame 14 is substantially rigid (e.g., does not include any translatable and/or rotatable components) and formed from multiple frame elements (e.g., rails, tubes, braces, struts, etc.) coupled to one another (e.g., via welded connection(s), via fastener(s), etc.). The hitch assembly 16 includes a hitch frame 18 and a hitch 20. The hitch frame 18 is pivotally coupled to the implement frame 14 via pivot joint(s) 22, and the hitch 20 is configured to couple to a corresponding hitch of a work vehicle (e.g., tractor), which is configured to tow the agricultural implement 10 through a field along a direction of travel 24. While the hitch frame 18 is pivotally coupled to the implement frame 14 in the illustrated embodiment, in other embodiments, the hitch frame may be movably coupled to the implement frame by a linkage assembly (e.g., four bar linkage assembly, etc.) or another suitable assembly/mechanism that enables the hitch to move vertically relative to the implement frame.

As illustrated, the agricultural implement 10 includes wheel assemblies 26 movably coupled to the implement frame 14. In the illustrated embodiment, each wheel assembly 26 includes a wheel frame 27 and a wheel 28 rotatably coupled to the wheel frame 27. The wheels 28 of the wheel assemblies 26 are configured to engage the surface of the soil, and the wheel assemblies 26 are configured to support at least a portion of the weight of the agricultural implement 10. In the illustrated embodiment, each wheel frame 27 is pivotally coupled to the implement frame 14, thereby facilitating adjustment of the vertical position of each wheel 28. However, in other embodiments, at least one wheel frame may be movably coupled to the implement frame by another suitable connection (e.g., sliding connection, linkage assembly, etc.) that facilitates adjustment of the vertical position of the respective wheel(s). Furthermore, while the agricultural implement includes two wheel assemblies in the illustrated embodiment, in other embodiments, the agricultural implement may include additional wheel assemblies (e.g., 1, 2, 3, 4, 5, 6, or more). In addition, each wheel assembly may include any suitable number of wheels (e.g., 1, 2, 3, 4, 5, 6, or more).

In the illustrated embodiment, the agricultural implement 10 includes ground engaging tools, such as the illustrated disc blades 29, tillage point assemblies 30, and finishing discs 32. The disc blades 29 are configured to engage a top layer of the soil. As the agricultural implement 10 is towed through the field, the disc blades 29 are driven to rotate, thereby breaking up the top layer. In the illustrated embodiment, the disc blades 29 are arranged in two rows. However, in other embodiments, the disc blades may be arranged in more or fewer rows (e.g., 1, 2, 3, 4, 5, 6, or more). In addition, the angle of each row relative to the direction of travel 24 may be selected to control the interaction of the disc blades 29 with the top layer of soil. The tillage point assemblies 30 are configured to engage the soil at a greater depth, thereby breaking up a lower layer of the soil. Each tillage point assembly 30 includes a tillage point and a shank. The shank is configured to position the tillage point beneath the soil surface, and the tillage point is configured to break up the soil. The shape of each tillage point, the arrangement of the tillage point assemblies, and the number of tillage point assemblies may be selected to control tillage within the field. Furthermore, as the agricultural implement 10 is towed through the field, the finishing discs 32 are driven to rotate, thereby sizing soil clods, leveling the soil surface, smoothing the soil surface, cutting residue on the soil surface, or a combination thereof.

In the illustrated embodiment, the finishing discs 32 are rotatably coupled to a finishing disc frame 31, and the finishing disc frame 31 is pivotally coupled to the implement frame 14. In addition, biasing member(s) may extend between the implement frame 14 and the finishing disc frame 31. The biasing member(s) are configured to urge the finishing disc frame 31 toward the surface of the soil, thereby driving the finishing discs 32 to engage the soil. While the finishing disc frame is pivotally coupled to the implement frame in the illustrated embodiment, in other embodiments, the finishing disc frame may be movable coupled to the implement frame by a linkage assembly (e.g., four bar linkage assembly, etc.) or another suitable assembly/mechanism that enables the finishing disc frame to move vertically relative to the implement frame. Furthermore, in certain embodiments, the finishing disc frame may be non-translatably and/or non-rotatably coupled to the implement frame, or the finishing disc frame may be omitted, and the finishing discs may be coupled to the implement frame.

While the illustrated agricultural implement includes the disc blades 29, the tillage point assemblies 30, and the finishing discs 32, in other embodiments, the agricultural implement may include other and/or additional ground engaging tool(s). For example, the disc blades, the tillage point assemblies, the finishing discs, or a combination thereof, may be omitted in certain embodiments. Furthermore, in certain embodiments, the agricultural implement may include one or more other suitable ground engaging tools, such as coulter(s), opener(s), and tine(s), among other suitable ground engaging tools. Furthermore, while the agricultural implement 10 is a primary tillage implement in the illustrated embodiment, in other embodiments, the agricultural implement may be a vertical tillage implement, another suitable type of tillage implement, a seeding implement, a planting implement, or another suitable type of implement.

In the illustrated embodiment, the agricultural implement 10 includes an orientation control system 12 configured to control a lateral orientation of the implement frame 14 (e.g., orientation of the implement frame about a longitudinal axis 33, which may be aligned with the direction of travel 24). The orientation control system 12 includes a first sensor 34 coupled to a left end portion 36 of the frame 14 of the agricultural implement 10. The first sensor 34 is directed toward the soil surface, and the first sensor 34 is configured to emit a first output signal toward the soil surface and to receive a first return signal indicative of a first height of the left end portion 36 of the frame 14 above the soil surface. As used herein, "left end portion" refers to a portion of the total width of the implement frame 14 along a lateral axis 35 that includes the left end of the implement frame. The portion may include 1 percent, 2 percent, 5 percent, 10 percent, or 15 percent of the total width of the implement frame 14 along the lateral axis. Furthermore, in certain embodiments, the first sensor may be mounted to the left end portion 36 of the implement frame 14 via an extension that positions the first sensor 34 laterally outward of the left end of the implement frame.

The orientation control system 12 also includes a second sensor 38 coupled to a right end portion 40 of the frame 14 of the agricultural implement 10, such that the first and second sensors are positioned on opposite lateral sides of the implement frame 14 (e.g., opposite sides along the lateral axis 35). The second sensor 38 is directed toward the soil surface, and the second sensor 38 is configured to emit a second output signal toward the soil surface and to receive a second return signal indicative of a second height of the right end portion 40 of the frame 14 above the soil surface. As used herein, "right end portion" refers to a portion of the total width of the implement frame 14 along the lateral axis 35 that includes the right end of the implement frame. The portion may include 1 percent, 2 percent, 5 percent, 10 percent, or 15 percent of the total width of the implement frame along the lateral axis 35. Furthermore, in certain embodiments, the second sensor may be mounted to the right end portion 40 of the implement frame 14 via an extension that positions the second sensor 38 laterally outward of the right end of the implement frame.

Furthermore, the orientation control system 12 includes a first actuator 42 coupled to the implement frame 14 and to the hitch frame 18 of the hitch assembly 16. The first actuator 42 is configured to control a position of the hitch 20 of the hitch assembly 16 relative to the implement frame 14 along the vertical axis. While the orientation control system 12 includes a single first actuator 42 in the illustrated embodiment, in other embodiments, the orientation control system may include more first actuators extending between the implement frame and the hitch frame. Furthermore, while the first actuator 42 is coupled to the hitch frame 18 in the illustrated embodiment, in other embodiments, the first actuator may be coupled directly to the hitch or another suitable element of the hitch assembly. In addition, the orientation control system 12 includes a second actuator 44 coupled to the implement frame 14 and to the wheel frame 27 of a first wheel assembly 45. The second actuator 44 is configured to control a position of the first wheel assembly 45 relative to the implement frame 14 along the vertical axis. For example, the second actuator 44 may control a vertical position of the respective wheel 28 relative to the implement frame 14. Furthermore, the orientation control system 12 includes a third actuator 46 coupled to the implement frame 14 and to the wheel frame 27 of a second wheel assembly 47. The third actuator 46 is configured to control a position of the second wheel assembly 47 relative to the implement frame 14 along the vertical axis. For example, the third actuator 46 may control a vertical position of the respective wheel 28 relative to the implement frame 14. While the orientation control system 12 includes two wheel assembly actuators in the illustrated embodiment, in other embodiments, the orientation control system may include additional wheel assembly actuators (e.g., one wheel assembly actuator for each wheel assembly, multiple wheel assembly actuators for at least one wheel assembly, etc.).

The orientation control system 12 includes a controller communicatively coupled to the first sensor 34, to the second sensor 38, to the first actuator 42, to the second actuators 44, and to the third actuator 46. The controller is configured to control the first, second, and third actuators such that the difference between the first height and the second height is less than a threshold value (e.g., 1 mm, 2 mm, 3 mm, 5 mm, 10 mm, 15 mm, or 20 mm). As a result, the implement frame 14 may be substantially maintained at an orientation that is parallel to the soil surface along the lateral/side-to-side direction during operation of the agricultural implement (e.g., as compared to an implement frame that is substantially maintained in a level orientation perpendicular to the direction of gravitational acceleration). Accordingly, at least a portion of the ground engaging tools (e.g., all of the ground engaging tools) may be substantially maintained at a target penetration depth beneath the soil surface, thereby enhancing the effectiveness of the agricultural operation (e.g., as compared to an agricultural implement having a frame that tilts relative to the soil surface during operations, thereby causing the penetration depth of the ground engaging tools to vary).

In certain embodiments, the second and third actuators are configured to move the respective wheels from the illustrated raised position to a lowered position. While the wheels are in the lowered position, the ground engaging tools of the agricultural implement are disengaged from the soil (e.g., to facilitate transport and/or inspection of the agricultural implement). The second and third actuators may lift the wheels from the lowered position to the illustrated raised position, thereby causing the ground engaging tools to engage the soil. Once the ground engaging tools are engaged with the soil, the work vehicle may tow the agricultural implement throughout a field.

In certain embodiments, the hitch assembly may be coupled to the wheel assemblies by a mechanical linkage. In such embodiments, the first actuator may control both the position of the hitch and the position of the wheel assemblies along the vertical axis. In addition, the second and third actuators may extend from the mechanical linkage to the respective wheel assemblies. Accordingly, the controller is configured to control the first, second, and third actuators to control the first and second heights of the implement frame. Furthermore, in certain embodiments, the first actuator may be omitted, and the hitch frame may freely move (e.g., rotate) relative to the implement frame. In such embodiments, the agricultural implement may include one or more forward wheel assemblies (e.g., one or more gauge wheel assemblies), and an actuator may extend from the implement frame to each respective forward wheel assembly. The controller may control each wheel actuator to control the first and second heights of the implement frame.

In certain embodiments, the orientation control system may include one or more additional sensors configured to determine height(s) of other portion(s) of the implement frame. For example, in certain embodiments, the first sensor 34 and the second sensor 38 may be positioned at a rearward end portion 37 of the implement frame 14, and a third sensor 39 may be positioned at a forward end portion 41 of the implement frame 14. In such embodiments, the third sensor 39 may be directed toward the soil surface, and the third sensor may be configured to emit a third output signal toward the soil surface and to receive a third return signal indicative of a third height of the forward end portion of the implement frame above the soil surface. The third sensor may be communicatively coupled to the controller, and the controller may be configured to control the first, second, and third actuators such that a difference between the first height and the second height is less than the threshold value, and a difference between the first height and the third height is less than the threshold value. As a result, the implement frame may be substantially maintained at an orientation that is parallel to the soil surface along the lateral/side-to-side direction and along the longitudinal/fore-aft direction during operation of the agricultural implement (e.g., as compared to an implement frame that is substantially maintained in a level orientation perpendicular to the direction of gravitational acceleration). Accordingly, at least a portion of the ground engaging tools (e.g., all of the ground engaging tools) may be substantially maintained at a target penetration depth beneath the soil surface, thereby enhancing the effectiveness of the agricultural operation (e.g., as compared to an agricultural implement having a frame that tilts relative to the soil surface during operations, thereby causing the penetration depth of the ground engaging tools to vary).

While in the embodiment disclosed above, the first and second sensors are positioned at the rearward end portion of the implement frame, and the third sensor is positioned at the forward end portion of the implement frame, in other embodiments, at least three sensors may be positioned at other suitable locations on the implement frame and/or on extension(s) coupled to the implement frame to facilitate determination of the height of the left end portion, the height of the right end portion, the height of the forward end portion, and the height of the rearward end portion of the implement frame. In addition, as used herein, "forward end portion" refers to a portion of the total length of the implement frame along the direction of travel that includes the forward end of the implement frame. The portion may include 1 percent, 2 percent, 5 percent, 10 percent, or 15 percent of the total length of the implement frame along the direction of travel. Furthermore, as used herein, "rearward end portion" refers to a portion of the total length of the implement frame along the direction of travel that includes the rearward end of the implement frame. The portion may include 1 percent, 2 percent, 5 percent, 10 percent, or 15 percent of the total length of the implement frame along the direction of travel.

Figure 2:
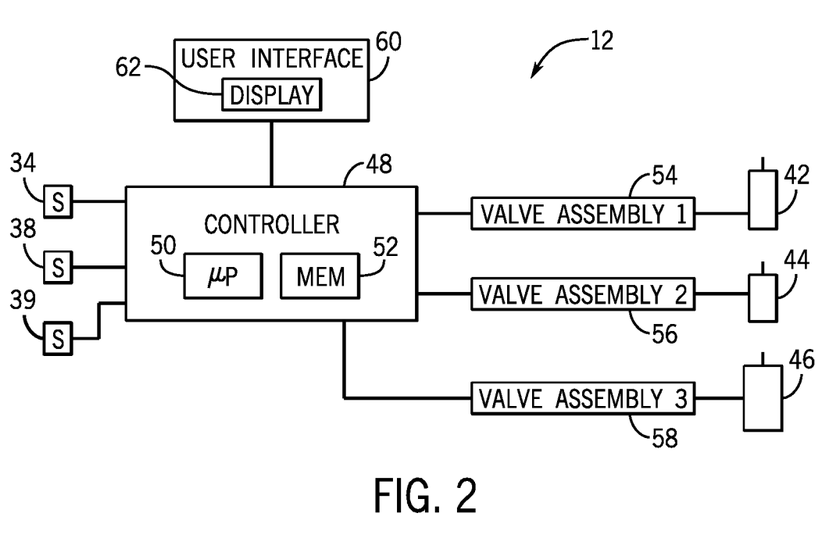
FIG. 2 is a schematic view of an embodiment of an orientation control system that may be employed within the agricultural implement of FIG. 1.

FIG. 2 is a schematic view of an embodiment of an orientation control system 12 that may be employed within the agricultural implement of FIG. 1. In the illustrated embodiment, the orientation control system 12 includes a controller 48 communicatively coupled to the first sensor 34, to the second sensor 38, to the first actuator 42, to the second actuator 44, and to the third actuator 46. The controller 48 is configured to control the first, second, and third actuators such that the difference between the first height of the left end portion of the implement frame and the second height of the right end portion of the implement frame is less than a threshold value. In the illustrated embodiment, the controller 48 is an element of the orientation control system 12 and may be located in/on the agricultural implement. However, in other embodiments, the controller may be located in/on a work vehicle coupled to the agricultural implement. Furthermore, in certain embodiments, one or more functions of the controller may be distributed across multiple control devices (e.g., the control devices forming the controller).

In certain embodiments, the controller 48 is an electronic controller having electrical circuitry configured to control the first, second, and third actuators. In the illustrated embodiment, the controller 48 includes a processor, such as the illustrated microprocessor 50, and a memory device 52. The controller 48 may also include one or more storage devices and/or other suitable components. The processor 50 may be used to execute software, such as software for controlling the first, second, and third actuators, and so forth. Moreover, the processor 50 may include multiple microprocessors, one or more "general-purpose" microprocessors, one or more special-purpose microprocessors, and/or one or more application specific integrated circuits (ASICS), or some combination thereof. For example, the processor 50 may include one or more reduced instruction set (RISC) processors.

The memory device 52 may include a volatile memory, such as random access memory (RAM), and/or a nonvolatile memory, such as read-only memory (ROM). The memory device 52 may store a variety of information and may be used for various purposes. For example, the memory device 52 may store processor-executable instructions (e.g., firmware or software) for the processor 50 to execute, such as instructions for controlling the first, second, and third actuators, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the first, second, and third actuators, etc.), and any other suitable data.

As previously discussed, the first sensor 34 is configured to emit a first output signal toward the soil surface and to receive a first return signal indicative of the first height of the left end portion of the implement frame above the soil surface. In addition, the second sensor 38 is configured to emit a second output signal toward the soil surface and to receive a second return signal indicative of the second height of the right end portion of the implement frame above the soil surface. The first sensor 34 and the second sensor 38 may include any suitable type of sensor configured to emit an output signal toward the soil surface and to receive a return signal indicative of a distance between the sensor and the soil surface. In certain embodiments, the first sensor and/or the second sensor may include an infrared sensor configured to emit an infrared signal toward the soil surface and to receive a return infrared signal from the soil surface. Furthermore, in certain embodiments, the first sensor and/or the second sensor may include a radio detection and ranging (RADAR) sensor (e.g., millimeter wave (MMW) scanner, etc.) configured to emit a radio frequency signal toward the soil surface and to receive a return radio frequency signal from the soil surface. In addition, in certain embodiments, the first sensor and/or the second sensor may include a lidar sensor (e.g., time-of-flight scanning laser, etc.) configured to emit a light signal toward the soil surface and to receive a return light signal from the soil surface. By way of further example, in certain embodiments, the first sensor and/or the second sensor may include an ultrasonic sensor configured to emit an ultrasonic signal toward the soil surface and to receive a return ultrasonic signal from the soil surface. Furthermore, in certain embodiments, the first sensor and/or the second sensor may include a capacitive sensor configured to emit an electric signal/field toward the soil surface and to receive a return electric signal from the soil surface (e.g., in the form of a change to the emitted electric signal/field). While the first sensor and the second sensor are non-contact sensors (e.g., configured to emit an output signal and to receive a return signal) in the illustrated embodiment, in other embodiments, the first sensor and/or the second sensor may be contact sensor(s) (e.g., including a ground contact element) configured to monitor the height of the respective end portion(s) of the frame above the soil surface.

In the illustrated embodiment, the first actuator 42 includes a hydraulic cylinder configured to control the position of the hitch of the hitch assembly relative to the implement frame along the vertical axis. In addition, the orientation control system 12 includes a first valve assembly 54 configured to control a flow of fluid (e.g., hydraulic fluid) to the first actuator 42/hydraulic cylinder. Accordingly, the controller 48 is communicatively coupled to the first actuator 42 via the first valve assembly 54. The first valve assembly may include any suitable number and/or type(s) of valve(s) (e.g., proportional control valve(s), gate valve(s), check valve(s), needle valve(s), etc.) and other suitable component(s) (e.g., hose(s), fluid passage(s), solenoid(s), etc.) to control the flow of fluid to the first actuator 42/hydraulic cylinder (e.g., from a fluid source) and, in certain embodiments, from the first actuator 42/hydraulic cylinder (e.g., to a fluid tank, etc.). The valve assembly may be located on the agricultural implement, the valve assembly may be located on the work vehicle towing the agricultural implement, or the valve assembly may be distributed between the agricultural implement and the work vehicle. While the first actuator 42 includes a single hydraulic cylinder in the illustrated embodiment, in other embodiments, the first actuator may include multiple hydraulic cylinders (e.g., 2, 3, 4, 5, 6, etc.). Furthermore, in certain embodiments, the first actuator may include any other suitable type(s) of actuator(s) (e.g., hydraulic motor(s), pneumatic cylinder(s), pneumatic motor(s), electromechanical actuator(s), linear actuator(s), screw drive(s), etc.). In embodiments in which the actuator(s) are controlled by fluid (e.g., air, hydraulic fluid, etc.), the actuator(s) may be communicatively coupled to the controller via an appropriate valve assembly.

In the illustrated embodiment, the second actuator 44 includes a hydraulic cylinder configured to control the position of the first wheel assembly relative to the implement frame along the vertical axis. In addition, the orientation control system 12 includes a second valve assembly 56 configured to control a flow of fluid (e.g., hydraulic fluid) to the second actuator 44/hydraulic cylinder. Accordingly, the controller 48 is communicatively coupled to the second actuator 44 via the second valve assembly 56. The second valve assembly may include any suitable number and/or type(s) of valve(s) (e.g., proportional control valve(s), gate valve(s), check valve(s), needle valve(s), etc.) and other suitable component(s) (e.g., hose(s), fluid passage(s), solenoid(s), etc.) to control the flow of fluid to the second actuator 44/hydraulic cylinder (e.g., from a fluid source) and, in certain embodiments, from the second actuator 44/hydraulic cylinder (e.g., to a fluid tank, etc.). The valve assembly may be located on the agricultural implement, the valve assembly may be located on the work vehicle towing the agricultural implement, or the valve assembly may be distributed between the agricultural implement and the work vehicle. While the second actuator 44 includes a single hydraulic cylinder in the illustrated embodiment, in other embodiments, the second actuator may include multiple hydraulic cylinders (e.g., 2, 3, 4, 5, 6, etc.). Furthermore, in certain embodiments, the second actuator may include any other suitable type(s) of actuator(s) (e.g., hydraulic motor(s), pneumatic cylinder(s), pneumatic motor(s), electromechanical actuator(s), linear actuator(s), screw drive(s), etc.). In embodiments in which the actuator(s) are controlled by fluid (e.g., air, hydraulic fluid, etc.), the actuator(s) may be communicatively coupled to the controller via an appropriate valve assembly.

Furthermore, in the illustrated embodiment, the third actuator 46 includes a hydraulic cylinder configured to control the position of the second wheel assembly relative to the implement frame along the vertical axis. In addition, the orientation control system 12 includes a third valve assembly 58 configured to control a flow of fluid (e.g., hydraulic fluid) to the third actuator 46/hydraulic cylinder. Accordingly, the controller 48 is communicatively coupled to the third actuator 46 via the third valve assembly 58. The third valve assembly may include any suitable number and/or type(s) of valve(s) (e.g., proportional control valve(s), gate valve(s), check valve(s), needle valve(s), etc.) and other suitable component(s) (e.g., hose(s), fluid passage(s), solenoid(s), etc.) to control the flow of fluid to the third actuator 46/hydraulic cylinder (e.g., from a fluid source) and, in certain embodiments, from the third actuator 46/hydraulic cylinder (e.g., to a fluid tank, etc.). The valve assembly may be located on the agricultural implement, the valve assembly may be located on the work vehicle towing the agricultural implement, or the valve assembly may be distributed between the agricultural implement and the work vehicle. While the third actuator 46 includes a single hydraulic cylinder in the illustrated embodiment, in other embodiments, the third actuator may include multiple hydraulic cylinders (e.g., 2, 3, 4, 5, 6, etc.). Furthermore, in certain embodiments, the third actuator may include any other suitable type(s) of actuator(s) (e.g., hydraulic motor(s), pneumatic cylinder(s), pneumatic motor(s), electromechanical actuator(s), linear actuator(s), screw drive(s), etc.). In embodiments in which the actuator(s) are controlled by fluid (e.g., air, hydraulic fluid, etc.), the actuator(s) may be communicatively coupled to the controller via an appropriate valve assembly.

The controller 48 is configured to control the first, second, and third actuators such that a difference between the first height of the left end portion of the implement frame above the soil surface and the second height of the right end portion of the implement frame above the soil surface is less than a threshold value. As a result, the implement frame may be substantially maintained at an orientation that is parallel to the soil surface along the lateral/side-to-side direction during operation of the agricultural implement (e.g., as compared to an implement frame that is substantially maintained in a level orientation perpendicular to the direction of gravitational acceleration). Accordingly, at least a portion of the ground engaging tools (e.g., all of the ground engaging tools) may be substantially maintained at a target penetration depth beneath the soil surface, thereby enhancing the effectiveness of the agricultural operation (e.g., as compared to an agricultural implement having a frame that tilts relative to the soil surface during operations, thereby causing the penetration depth of the ground engaging tools to vary).

Furthermore, in certain embodiments, the controller 48 is configured to control the first, second, and third actuators such that a difference between the first height and a target height is less than a second threshold value, and a difference between the second height and the target height is less than the second threshold value. Accordingly, the target height may be substantially maintained along the width of the implement frame (e.g., along the lateral direction). The target height may be selected to establish the target penetration depth of at least a portion of the ground engaging tools (e.g., all of the ground engaging tools) beneath the soil surface. The second threshold value may be any suitable distance, such as 1 mm, 2 mm, 3 mm, 5 mm, 10 mm, 15 mm, or 20 mm. The second threshold value may be the same or different from the first threshold value (e.g., the threshold value associated with the difference between the first height and the second height). For example, the second threshold value may be less than the first threshold value, such that during operation of the agricultural implement, the difference between the first height and the second height may be greater than the difference between each height and the target height (e.g., while the left end portion of the implement frame is above the target height, and the right end portion of the implement frame is below the target height).

In the illustrated embodiment, the orientation control system 12 includes a user interface 60 communicatively coupled to the controller 48. The user interface 60 may include any suitable control(s) configured to enable an operator to interact with (e.g., provide input to, etc.) the orientation control system 12, such as a keyboard, a mouse, one or more switches, one or more buttons, and one or more knobs. For example, the operator may input the first height, the second height, the threshold value(s), other suitable parameters, or a combination thereof, into the user interface. The user interface, in turn, may output signal(s) to the controller indicative of the input values. In the illustrated embodiment, the user interface includes a display 62 configured to present information to the operator. For example, the display 62 may present the first height of the left end portion of the implement frame above the soil surface, the second height of the right end portion of the implement frame above the soil surface, a difference between the first height and the second height, the threshold value(s), other suitable parameters, or a combination thereof. In addition, in certain embodiments, the display may include a touchscreen interface configured to enable an operator to provide input to the controller via the display.

As previously discussed, the orientation control system may include one or more additional sensors configured to determine height(s) of other portion(s) of the implement frame. For example, in certain embodiments, the first sensor 34 and the second sensor 38 may be positioned at a rearward end portion of the implement frame, and the third sensor 39 may be positioned at a forward end portion of the implement frame. In such embodiments, the third sensor 39 may be directed toward the soil surface, and the third sensor 39 may be configured to emit a third output signal toward the soil surface and to receive a third return signal indicative of a third height of the forward end portion of the implement frame above the soil surface. The third sensor 39 may include any suitable type of sensor, such as the sensors described above with reference to the first and second sensors. The third sensor 39 may be communicatively coupled to the controller 48, and the controller 48 may be configured to control the first, second, and third actuators such that a difference between the first height and the second height is less than the threshold value (e.g., the first threshold value), and a difference between the first height and the third height is less than the threshold value (e.g., the first threshold value). As a result, the implement frame may be substantially maintained at an orientation that is parallel to the soil surface along the lateral/side-to-side direction and along the longitudinal/fore-aft direction during operation of the agricultural implement (e.g., as compared to an implement frame that is substantially maintained in a level orientation perpendicular to the direction of gravitational acceleration). Accordingly, at least a portion of the ground engaging tools (e.g., all of the ground engaging tools) may be substantially maintained at a target penetration depth beneath the soil surface, thereby enhancing the effectiveness of the agricultural operation (e.g., as compared to an agricultural implement having a frame that tilts relative to the soil surface during operations, thereby causing the penetration depth of the ground engaging tools to vary). Furthermore, in certain embodiments, the controller may be configured to control the first, second, and third actuators such that a difference between the first height and the target height is less than the second threshold value, a difference between the second height and the target height is less than the second threshold value, and a difference between the third height and the target height is less than the second threshold value. Accordingly, the target height may be substantially maintained along the width of the implement frame (e.g., along the lateral direction) and along the length of the implement frame (e.g., along the longitudinal direction).

Figure 3:
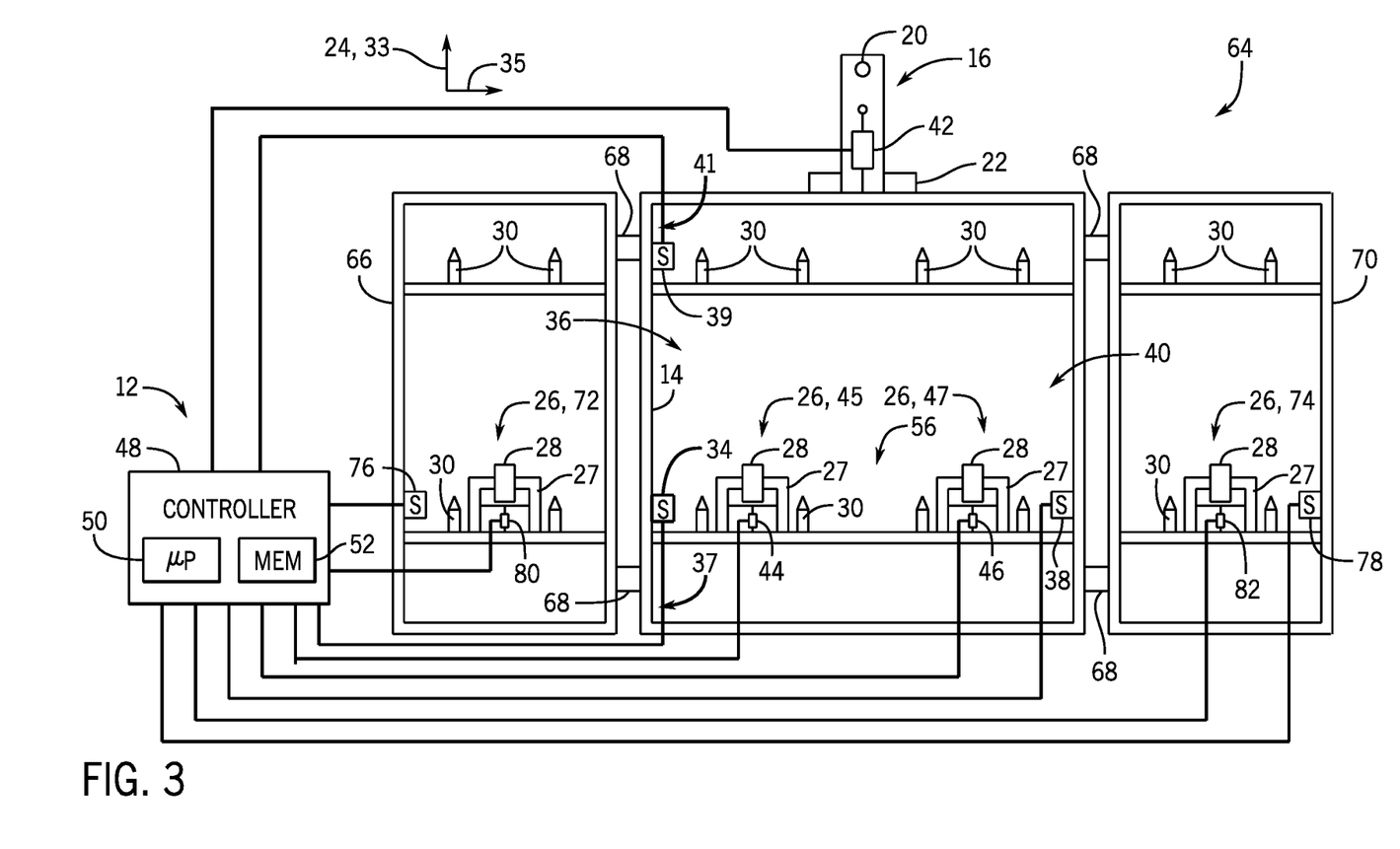
FIG. 3 is a top view of another embodiment of an agricultural implement having wing frames rotatably coupled to a main frame.

FIG. 3 is a top view of another embodiment of an agricultural implement 64 having wing frames rotatably coupled to a main frame 14. In the illustrated embodiment, the main frame 14 (e.g., implement frame) is configured to support a first group of ground engaging tools, such as the illustrated tillage point assemblies 30. While the main frame 14 supports two rows of tillage point assemblies 30 in the illustrated embodiment, in other embodiments, the main frame 14 may support more or fewer rows of tillage point assemblies (e.g., 1, 2, 3, 4, 5, 6, 7, 8, or more). Furthermore, while the main frame 14 includes tillage point assemblies 30 in the illustrated embodiment, in other embodiments, the main frame may support other suitable ground engaging tools, such as disc blades and finishing discs, among other suitable ground engaging tools.

In the illustrated embodiment, the agricultural implement 64 includes a first wing frame 66 pivotally coupled to the main frame 14 by one or more pivot joints 68. The pivot joints 68 enable the first wing frame 66 to pivot about the longitudinal axis 33 relative to the main frame 14, thereby enabling the first wing frame 66 to follow contours of the soil surface. Furthermore, the agricultural implement 64 includes a second wing frame 70 pivotally coupled to the main frame 14 by one or more pivot joints 68. The second wing frame 70 is positioned on the opposite lateral side of the main frame 14 from the first wing frame. The pivot joints 68 enable the second wing frame 70 to pivot about the longitudinal axis 33 relative to the main frame 14, thereby enabling the second wing frame 70 to follow contours of the soil surface.

Furthermore, the first wing frame 66 supports a second group of ground engaging tools, such as the illustrated tillage point assemblies 30, and the second wing frame 70 supports a third group of ground engaging tools, such as the illustrated tillage point assemblies 30. Each wing frame may support the same type(s) of ground engaging tools as the main frame, or at least one wing frame may support different type(s) of ground engaging tools from the main frame. While the agricultural implement has two wing frames in the illustrated embodiment, in other embodiments, the agricultural implement may include more or fewer wing frames. For example, the agricultural implement may include a single wing frame positioned on one lateral side of the main frame. In addition, the agricultural implement may include multiple wing frames on at least one lateral side of the main frame (e.g., in which at least two of the wing frames are pivotally coupled to one another by respective pivot joint(s)).

In the illustrated embodiment, the first wheel assembly 45 and the second wheel assembly 47 are movably coupled to the main frame 14. In addition, a third wheel assembly 72 is movably coupled to the first wing frame 66, and a fourth wheel assembly 74 is movably coupled to the second wing frame 70. Each wheel assembly 26 includes a wheel frame 27 and a wheel 28 rotatably coupled to the wheel frame. In the illustrated embodiment, each wheel frame 27 is pivotally coupled to the respective frame (e.g., main frame or wing frame), thereby facilitating adjustment of the position of each wheel 28 along the vertical axis. However, in other embodiments, at least one wheel frame may be movably coupled to the respective frame (e.g., main frame or wing frame) by another suitable connection (e.g., sliding connection, linkage assembly, etc.) that facilitates adjustment of the vertical position of the respective wheel(s). Furthermore, while two wheel assemblies 26 are coupled to the main frame 14 in the illustrated embodiment, in other embodiments, additional wheel assemblies (e.g., 1, 2, 3, 4, 5, 6, or more) may be coupled to the main frame. While one wheel assembly 26 is coupled to each wing frame in the illustrated embodiment, in other embodiments, additional wheel assemblies (e.g., 1, 2, 3, 4, 5, 6, or more) may be coupled to at least one wing frame. In addition, each wheel assembly may include any suitable number of wheels (e.g., 1, 2, 3, 4, 5, 6, or more).

As illustrated, the hitch assembly 16 is movably coupled to the main frame 14, and the hitch 20 of the hitch assembly 16 is configured to engaging a corresponding hitch of a work vehicle (e.g., tractor), which is configured to tow the agricultural implement 64 through a field along the direction of travel 24. The hitch frame 18 of the hitch assembly 16 is pivotally coupled to the main frame 14 via pivot joint(s) 22. However, in other embodiments, the hitch frame may be movably coupled to the main frame by a linkage assembly (e.g., four bar linkage assembly, etc.) or another suitable assembly/mechanism that enables the hitch to move along the vertical axis relative to the main frame.

In the illustrated embodiment, the orientation control system 12 includes the first sensor 34 coupled to the left end portion 36 of the main frame 14 (e.g., proximate to a first ground engaging tool (e.g., tillage point assembly 30) of the first group of ground engaging tools). As previously discussed, the first sensor 34 is configured to emit the first output signal toward the soil surface and to receive the first return signal indicative of the first height of the left end portion 36 of the main frame 14 above the soil surface. In addition, the orientation control system 12 include the second sensor 38 coupled to the right end portion 40 of the main frame 14 (e.g., proximate to a second ground engaging tool (e.g., tillage point assembly 30) of the first group of ground engaging tools). As previously discussed, the second sensor 38 is configured to emit the second output signal toward the soil surface and to receive the second return signal indicative of the second height of the right end portion 40 of the main frame 14 above the soil surface.

Furthermore, the orientation control system 12 includes the first actuator 42 coupled to the main frame 14 and to the hitch assembly 16. The first actuator 42 is configured to control the position of the hitch 20 of the hitch assembly 16 relative to the main frame 14 along the vertical axis. The orientation control system 12 also includes the second actuator 44 coupled to the main frame 14 and to the first wheel assembly 45. The second actuator 44 is configured to control the position of the first wheel assembly 45 relative to the main frame 14 along the vertical axis. In addition, the orientation control system 12 includes the third actuator 46 coupled to the main frame 14 and to the second wheel assembly 47. The third actuator 46 is configured to control the position of the second wheel assembly 47 relative to the main frame 14 along the vertical axis.

In the illustrated embodiment, the controller 48 is communicatively coupled to the first sensor 34, to the second sensor 38, to the first actuator 42, to the second actuator 44, and to the third actuator 46. Similar to the embodiment described above with reference to FIGS. 1-2, the controller 48 is configured to control the first, second, and third actuators such that a difference between the first height and the second height is less than the threshold value. As a result, the main frame 14 may be substantially maintained at an orientation that is parallel to the soil surface along the lateral/side-to-side direction during operation of the agricultural implement (e.g., as compared to an implement frame that is substantially maintained in a level orientation perpendicular to the direction of gravitational acceleration). Accordingly, at least a portion of the ground engaging tools (e.g., all of the ground engaging tools) may be substantially maintained at a target penetration depth beneath the soil surface, thereby enhancing the effectiveness of the agricultural operation (e.g., as compared to an agricultural implement having a frame that tilts relative to the soil surface during operations, thereby causing the penetration depth of the ground engaging tools to vary).

The illustrated agricultural implement/orientation control system may include any of the variations disclosed above with reference to the embodiment of FIGS. 1-2 (e.g., variation in the number of actuators, variations in the positions of the sensors, control of the main frame in the fore-aft/longitudinal direction, the hitch assembly being coupled to the wheel assemblies by a mechanical linkage, etc.). For example, in certain embodiments, the orientation control system may include one or more additional sensors configured to determine height(s) of other portion(s) of the implement frame. For example, in certain embodiments, the first sensor 34 and the second sensor 38 may be positioned at the rearward end portion 37 of the main frame 14, and the third sensor 39 may be positioned at the forward end portion 41 of the main frame 14. In such embodiments, the third sensor 39 may be directed toward the soil surface, and the third sensor may be configured to emit a third output signal toward the soil surface and to receive a third return signal indicative of a third height of the forward end portion of the main frame above the soil surface. The third sensor may be communicatively coupled to the controller 48, and the controller 48 may be configured to control the first, second, and third actuators such that a difference between the first height and the second height is less than the threshold value, and a difference between the first height and the third height is less than the threshold value. As a result, the main frame may be substantially maintained at an orientation that is parallel to the soil surface along the lateral/side-to-side direction and along the longitudinal/fore-aft direction during operation of the agricultural implement (e.g., as compared to a main frame that is substantially maintained in a level orientation perpendicular to the direction of gravitational acceleration). Accordingly, at least a portion of the ground engaging tools (e.g., all of the ground engaging tools) on the main frame may be substantially maintained at a target penetration depth beneath the soil surface, thereby enhancing the effectiveness of the agricultural operation (e.g., as compared to an agricultural implement having a main frame that tilts relative to the soil surface during operations, thereby causing the penetration depth of the ground engaging tools to vary). While in the embodiment disclosed above, the first and second sensors are positioned at the rearward end portion of the main frame, and the third sensor is positioned at the forward end portion of the main frame, in other embodiments, at least three sensors may be positioned at other suitable locations on the main frame and/or on extension(s) coupled to the main frame to facilitate determination of the height of the left end portion, the height of the right end portion, the height of the forward end portion, and the height of the rearward end portion of the main frame.

In the illustrated embodiment, the orientation control system 12 includes a fourth sensor 76 coupled to the first wing frame 66 (e.g., proximate to a ground engaging tool (e.g., tillage point assembly 30) of the second group of ground engaging tools). The fourth sensor 76 is communicatively coupled to the controller 48 and directed toward the soil surface. In addition, the fourth sensor 76 is configured to emit a third output signal toward the soil surface and to receive a third return signal indicative of a third height of the first wing frame 66 above the soil surface. Furthermore, the orientation control system 12 includes a fifth sensor 78 mounted to the second wing frame 70 (e.g., proximate to a ground engaging tool (e.g., tillage point assembly 30) of the third group of ground engaging tools). The fifth sensor 78 is communicatively coupled to the controller 48 and directed toward the soil surface. In addition, the fifth sensor 78 is configured to emit a fourth output signal toward the soil surface and to receive a fourth return signal indicative of a fourth height of the second wing frame 70 above the soil surface. The fourth sensor and the fifth sensor may include any suitable type of sensor, such as the sensors described above with reference to the first sensor and the second sensor. Furthermore, in embodiments having more or fewer wing frames, the orientation control system may include one sensor for each wing frame.

In the illustrated embodiment, the orientation control system 12 includes a fourth actuator 80 coupled to the first wing frame 66 and to the wheel frame 27 of the third wheel assembly 72. The fourth actuator 80 is configured to control a position of the third wheel assembly 72 relative to the first wing frame 66 along the vertical axis. While the orientation control system 12 includes a single fourth actuator 80 in the illustrated embodiment, in other embodiments, the orientation control system may include more fourth actuators extending between the first wing frame and the third wheel assembly. Furthermore, in embodiments in which multiple wheel assemblies are coupled to the first wing frame, the orientation control system may include at least one fourth actuator for each wheel assembly. In addition, the orientation control system 12 includes a fifth actuator 82 coupled to the second wing frame 70 and to the wheel frame 27 of the fourth wheel assembly 74. The fifth actuator 82 is configured to control a position of the fourth wheel assembly 74 relative to the second wing frame 70 along the vertical axis. While the orientation control system 12 includes a single fifth actuator 82 in the illustrated embodiment, in other embodiments, the orientation control system may include more fifth actuators extending between the second wing frame and the fourth wheel assembly. Furthermore, in embodiments in which multiple wheel assemblies are coupled to the second wing frame, the orientation control system may include at least one fifth actuator for each wheel assembly. In the illustrated embodiment, the fourth and fifth actuators are communicatively coupled to the controller 48 (e.g., via respective valve assemblies, such as the valve assemblies described above with reference to FIG. 2).

In certain embodiments, the controller is configured to control the first actuator 42, the second actuator 44, the third actuator 46, and the fourth actuator 80 such that a difference between the first height and the second height is less than a threshold value (e.g., 1 mm, 2 mm, 3 mm, 5 mm, 10 mm, 15 mm, or 20 mm), and a difference between the first height and the third height is less than the threshold value. As a result, the main frame and the first wing frame may be substantially maintained at an orientation that is parallel to the soil surface along the lateral/side-to-side direction during operation of the agricultural implement. Accordingly, at least a portion of the first group of ground engaging tools (e.g., all of the ground engaging tools of the first group) and at least a portion of the second group of ground engaging tools (e.g., all of the ground engaging tools of the second group) may be substantially maintained at a target penetration depth beneath the soil surface, thereby enhancing the effectiveness of the agricultural operation.

Furthermore, in certain embodiments, the controller 48 is configured to control the first, second, third, and fourth actuators such that a difference between the first height and a target height is less than a second threshold value, a difference between the second height and the target height is less than the second threshold value, and a difference between the third height and the target height is less than the second threshold value. Accordingly, the target height may be substantially maintained along the width of the implement frame and the first wing frame (e.g., along the lateral direction). The target height may be selected to establish the target penetration depth of at least a portion of the ground engaging tools (e.g., all of the ground engaging tools) beneath the soil surface. The second threshold value may be any suitable distance, such as 1 mm, 2 mm, 3 mm, 5 mm, 10 mm, 15 mm, or 20 mm. In addition, the second threshold value may be the same or different from the first threshold value (e.g., the threshold value associated with the difference between the first height and the second/third height).

In addition, in certain embodiments, the controller 48 is configured to control the first actuator 42, the second actuator 44, the third actuator 46, the fourth actuator 80, and the fifth actuator 82 such that a difference between the first height and the second height is less than a threshold value (e.g., 1 mm, 2 mm, 3 mm, 5 mm, 10 mm, 15 mm, or 20 mm), a difference between the first height and the third height is less than the threshold value, and a difference between the first height and the fourth height is less than the threshold value. As a result, the main frame, the first wing frame, and the second wing frame may be substantially maintained at an orientation that is parallel to the soil surface along the lateral/side-to-side direction during operation of the agricultural implement. Accordingly, at least a portion of the first group of ground engaging tools (e.g., all of the ground engaging tools of the first group), at least a portion of the second group of ground engaging tools (e.g., all of the ground engaging tools of the second group), and at least a portion of the third group of ground engaging tools (e.g., all of the ground engaging tools of the third group) may be substantially maintained at a target penetration depth beneath the soil surface, thereby enhancing the effectiveness of the agricultural operation.

Furthermore, in certain embodiments, the controller 48 is configured to control the first, second, third, fourth, and fifth actuators such that a difference between the first height and a target height is less than a second threshold value, a difference between the second height and the target height is less than the second threshold value, a difference between the third height and the target height is less than the second threshold value, and a difference between the fourth height and the target height is less than the second threshold value. Accordingly, the target height may be substantially maintained along the width of the implement frame, the first wing frame, and the second wing frame (e.g., along the lateral direction). The target height may be selected to establish the target penetration depth of at least a portion of the ground engaging tools (e.g., all of the ground engaging tools) beneath the soil surface. The second threshold value may be any suitable distance, such as 1 mm, 2 mm, 3 mm, 5 mm, 10 mm, 15 mm, or 20 mm. In addition, the second threshold value may be the same or different from the first threshold value (e.g., the threshold value associated with the difference between the first height and the second/third/fourth height).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An orientation control system for an agricultural implement, comprising:

a first sensor configured to be positioned at a left end portion of a frame of the agricultural implement and directed toward a soil surface, wherein the first sensor is configured to emit a first output signal toward the soil surface and to receive a first return signal indicative of a first height of the left end portion of the frame above the soil surface;

a second sensor configured to be positioned at a right end portion of the frame of the agricultural implement and directed toward the soil surface, wherein the second sensor is configured to emit a second output signal toward the soil surface and to receive a second return signal indicative of a second height of the right end portion of the frame above the soil surface, and the first and second sensors are configured to be positioned at one of a forward end portion of the frame or a rearward end portion of the frame;

a third sensor configured to be positioned at the other of the forward end portion of the frame or the rearward end portion of the frame, wherein the third sensor is configured to be directed toward the soil surface, and the third sensor is configured to emit a third output signal toward the soil surface and to receive a third return signal indicative of a third height of the other of the forward end portion of the frame or the rearward end portion of the frame;

a first actuator configured to be coupled to a hitch assembly of the agricultural implement, wherein the first actuator is configured to control a position of a hitch of the hitch assembly relative to the frame along a vertical axis;

a second actuator configured to be coupled to a first wheel assembly of the agricultural implement, wherein the second actuator is configured to control a position of the first wheel assembly relative to the frame along the vertical axis;

a third actuator configured to be coupled to a second wheel assembly of the agricultural implement, wherein the third actuator is configured to control a position of the second wheel assembly relative to the frame along the vertical axis; and a controller comprising a memory and a processor, wherein the controller is communicatively coupled to the first sensor, to the second sensor, to the third sensor, to the first actuator, to the second actuator, and to the third actuator, and the controller is configured to control the first, second, and third actuators such that a difference between the first height and the second height is less than a threshold value, and a difference between the first height and the third height is less than the threshold value.

2. The orientation control system of claim 1, wherein the first sensor comprises an infrared sensor, a radio detection and ranging sensor, a lidar sensor, an ultrasonic sensor, or a capacitive sensor;

wherein the second sensor comprises an infrared sensor, a radio detection and ranging sensor, a lidar sensor, an ultrasonic sensor, or a capacitive sensor; and wherein the third sensor comprises an infrared sensor, a radio detection and ranging sensor, a lidar sensor, an ultrasonic sensor, or a capacitive sensor.

3. The orientation control system of claim 1, wherein the controller is configured to control the first, second, and third actuators such that a difference between the first height and a target height is less than a second threshold value, a difference between the second height and the target height is less than the second threshold value, and a difference between the third height and the target height is less than the second threshold value.

4. The orientation control system of claim 1, comprising a first valve assembly, wherein the first actuator comprises a hydraulic cylinder, the first valve assembly is configured to control a flow of fluid to the first actuator, and the controller is communicatively coupled to the first actuator via the first valve assembly.

5. The orientation control system of claim 1, comprising a second valve assembly, wherein the second actuator comprises a hydraulic cylinder, the second valve assembly is configured to control a flow of fluid to the second actuator, and the controller is communicatively coupled to the second actuator via the second valve assembly.

6. The orientation control system of claim 1, comprising a third valve assembly, wherein the third actuator comprises a hydraulic cylinder, the third valve assembly is configured to control a flow of fluid to the third actuator, and the controller is communicatively coupled to the third actuator via the third valve assembly.

7. An agricultural implement, comprising:
a frame configured to support a plurality of ground engaging tools;
a first wheel assembly movably coupled to the frame;
a second wheel assembly movably coupled to the frame;
a hitch assembly movably coupled to the frame, wherein the hitch assembly comprises a hitch configured to engage a corresponding hitch of a work vehicle;
an orientation control system, comprising:
a first sensor coupled to a left end portion of the frame and directed toward a soil surface, wherein the first sensor is configured to emit a first output signal toward the soil surface and to receive a first return signal indicative of a first height of the left end portion of the frame above the soil surface;
a second sensor coupled to a right end portion of the frame and directed toward the soil surface, wherein the second sensor is configured to emit a second output signal toward the soil surface and to receive a second return signal indicative of a second height of the right end portion of the frame above the soil surface, and the first and second sensors are coupled to one of a forward end portion of the frame or a rearward end portion of the frame;
a third sensor coupled to the other of the forward end portion of the frame or the rearward end portion of the frame, wherein the third sensor is configured to be directed toward the soil surface, and the third sensor is configured to emit a third output signal toward the soil surface and to receive a third return signal indicative of a third height of the other of the forward end portion of the frame or the rearward end portion of the frame;
a first actuator coupled to the hitch assembly, wherein the first actuator is configured to control a position of the hitch of the hitch assembly relative to the frame along a vertical axis;
a second actuator coupled to the first wheel assembly, wherein the second actuator is configured to control a position of the first wheel assembly relative to the frame along the vertical axis;
a third actuator coupled to the second wheel assembly, wherein the third actuator is configured to control a position of the second wheel assembly relative to the frame along the vertical axis; and a controller comprising a memory and a processor, wherein the controller is communicatively coupled to the first sensor, to the second sensor, to the third sensor, to the first actuator, to the second actuator, and to the third actuator, and the controller is configured to control the first, second, and third actuators such that a difference between the first height and the second height is less than a threshold value, and a difference between the first height and the third height is less than the threshold value.

8. The agricultural implement of claim 7, wherein the first sensor comprises an infrared sensor, a radio detection and ranging sensor, a lidar sensor, an ultrasonic sensor, or a capacitive sensor;
wherein the second sensor comprises an infrared sensor, a radio detection and ranging sensor, a lidar sensor, an ultrasonic sensor, or a capacitive sensor; and
wherein the third sensor comprises an infrared sensor, a radio detection and ranging sensor, a lidar sensor, an ultrasonic sensor, or a capacitive sensor.

9. The agricultural implement of claim 7, wherein the hitch assembly is pivotally coupled to the frame.

10. The agricultural implement of claim 7, wherein the first wheel assembly is pivotally coupled to the frame, and the second wheel assembly is pivotally coupled to the frame.

11. The agricultural implement of claim 7, wherein the controller is configured to control the first, second, and third actuators such that a difference between the first height and a target height is less than a second threshold value, a difference between the second height and the target height is less than the second threshold value, and a difference between the third height and the target height is less than the second threshold value.

12. The agricultural implement of claim 7, wherein the first actuator comprises a first hydraulic cylinder, the second actuator comprises a second hydraulic cylinder, and the third actuator comprises a third hydraulic cylinder.

13. The agricultural implement of claim 7, wherein the orientation control system comprises:
a first valve assembly configured to control a first flow of fluid to the first actuator, wherein the controller is communicatively coupled to the first actuator via the first valve assembly;
a second valve assembly configured to control a second flow of fluid to the second actuator, wherein the controller is communicatively coupled to the second actuator via the second valve assembly; and
a third valve assembly configured to control a third flow of fluid to the third actuator, wherein the controller is communicatively coupled to the third actuator via the third valve assembly.

14. An agricultural implement, comprising:
a main frame configured to support a first plurality of ground engaging tools;
a first wing frame pivotally coupled to the main frame, wherein the first wing frame is configured to support a second plurality of ground engaging tools;
a first wheel assembly movably coupled to the main frame;
a second wheel assembly movably coupled to the main frame;
a third wheel assembly movably coupled to the first wing frame;
a hitch assembly movably coupled to the main frame, wherein the hitch assembly comprises a hitch configured to engage a corresponding hitch of a work vehicle;
an orientation control system, comprising:
a first sensor coupled to a left end portion of the main frame, wherein the first sensor is directed toward a soil surface, and the first sensor is configured to emit a first output signal toward the soil surface and to receive a first return signal indicative of a first height of the left end portion of the main frame above the soil surface;
a second sensor coupled to a right end portion of the main frame, wherein the second sensor is directed toward the soil surface, and the second sensor is configured to emit a second output signal toward the soil surface and to receive a second return signal indicative of a second height of the right end portion of the main frame above the soil surface;
a third sensor coupled to the first wing frame, wherein the third sensor is directed toward the soil surface, and the third sensor is configured to emit a third output signal toward the soil surface and to receive a third return signal indicative of a third height of the first wing frame above the soil surface;
a first actuator coupled to the hitch assembly, wherein the first actuator is configured to control a position of the hitch of the hitch assembly relative to the main frame along a vertical axis;
a second actuator coupled to the first wheel assembly, wherein the second actuator is configured to control a position of the first wheel assembly relative to the main frame along the vertical axis;
a third actuator coupled to the second wheel assembly, wherein the third actuator is configured to control a position of the second wheel assembly relative to the main frame along the vertical axis;
a fourth actuator coupled to the third wheel assembly, wherein the fourth actuator is configured to control a position of the third wheel assembly relative to the first wing frame along the vertical axis; and
a controller comprising a memory and a processor, wherein the controller is communicatively coupled to the first sensor, to the second sensor, to the third sensor, to the first actuator, to the second actuator, to the third actuator, and to the fourth actuator, and the controller is configured to control the first, second, third, and fourth actuators such that a difference between the first height and the second height is less than a threshold value, and a difference between the first height and the third height is less than the threshold value.

15. The agricultural implement of claim 14, wherein the first sensor comprises an infrared sensor, a radio detection and ranging sensor, a lidar sensor, an ultrasonic sensor, or a capacitive sensor;
wherein the second sensor comprises an infrared sensor, a radio detection and ranging sensor, a lidar sensor, an ultrasonic sensor, or a capacitive sensor; and
wherein the third sensor comprises an infrared sensor, a radio detection and ranging sensor, a lidar sensor, an ultrasonic sensor, or a capacitive sensor.

16. The agricultural implement of claim 14, wherein the hitch assembly is pivotally coupled to the main frame.

17. The agricultural implement of claim 14, wherein the first wheel assembly is pivotally coupled to the main frame, the second wheel assembly is pivotally coupled to the main frame, and the third wheel assembly is pivotally coupled to the first wing frame.

18. The agricultural implement of claim 14, wherein the controller is configured to control the first, second, third, and fourth actuators such that a difference between the first height and a target height is less than a second threshold value, a difference between the second height and the target height is less than the second threshold value, and a difference between the third height and the target height is less than the second threshold value.

19. The agricultural implement of claim 14, wherein the first actuator comprises a first hydraulic cylinder, the second actuator comprises a second hydraulic cylinder, the third actuator comprises a third hydraulic cylinder, and the fourth actuator comprises a fourth hydraulic cylinder.

20. The agricultural implement of claim 14, comprising:
a second wing frame pivotally coupled to the main frame, wherein the second wing frame is configured to support a third plurality of ground engaging tools; and
a fourth wheel assembly movably coupled to the second wing frame;
wherein the orientation control system comprises:
a fourth sensor mounted to the second wing frame, wherein the fourth sensor is directed toward the soil surface, and the fourth sensor is configured to emit a fourth output signal toward the soil surface and to receive a fourth return signal indicative of a fourth height of the second wing frame above the soil surface; and
a fifth actuator coupled to the fourth wheel assembly, wherein the fifth actuator is configured to control a position of the fourth wheel assembly relative to the second wing frame along the vertical axis;
wherein the controller is communicatively coupled to the fourth sensor and to the fifth actuator, and the controller is configured to control the first, second, third, fourth, and fifth actuators such that the difference between the first height and the second height is less than the threshold value, the difference between the first height and the third height is less than the threshold value, a the difference between the first height and the fourth height is less than the threshold value.

* * * * *